US007028068B1

(12) United States Patent
Goveas et al.

(10) Patent No.: US 7,028,068 B1
(45) Date of Patent: Apr. 11, 2006

(54) ALTERNATE PHASE DUAL COMPRESSION-TREE MULTIPLIER

(75) Inventors: Kelvin D. Goveas, Austin, TX (US); Teik-Chung Tan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 642 days.

(21) Appl. No.: 10/357,978

(22) Filed: Feb. 4, 2003

(51) Int. Cl.
*G06F 7/52* (2006.01)

(52) U.S. Cl. ..................................... 708/625
(58) Field of Classification Search ................ 708/620, 708/625, 628, 630, 631
See application file for complete search history.

(56) References Cited

U.S. PATENT DOCUMENTS

| 4,972,362 A | * | 11/1990 | Elkind et al. ............... 708/632 |
| 5,047,973 A | * | 9/1991 | Steiss et al. ................ 708/620 |
| 5,113,364 A | * | 5/1992 | Ho et al. .................... 708/625 |
| 5,675,527 A | * | 10/1997 | Yano .......................... 708/628 |

OTHER PUBLICATIONS

M. J. Flynn, et al., "EE 486 Lecture 8: Integer Multiplication," Computer Architecture and Arithmetic Group, Stanford University, Feb. 5, 2001, 6 pages.
Gary Bewick, et al., "Binary Multiplication Using Partially Redundant Multiples," Technical Report No. CSL-TR-92-528, Jun. 1992, pp. 1-21.
Hesham Al-Twaijry, et al., "Performance/Area Tradeoffs in Booth Multipliers," Technical Report: CSL TR-95-684, Nov. 1995, pp. 1-18.

* cited by examiner

*Primary Examiner*—Chuong D Ngo
(74) *Attorney, Agent, or Firm*—Lawrence J. Merkel; Meyertons, Hood, Kivlin, Kowert & Goetzel, P.C.

(57) ABSTRACT

A multiplier includes a plurality of subunits. Each of the plurality of subunits is configured to perform a portion of a multiplication operation, and the plurality of subunits are coupled together to perform the multiplication operation. At least a first subunit of the plurality of subunits and a second subunit of the plurality of subunits are configured to perform a same portion of the multiplication operation. The first subunit and the second subunit are clocked at a first clock frequency, during use, that is less than a second clock frequency at which a remainder of the plurality of subunits are clocked during use. The first subunit and the second subunit each have inputs coupled to a third subunit of the plurality of subunits to receive multiplication operations to be operated upon by the respective first subunit and second subunit.

23 Claims, 7 Drawing Sheets

ALTERNATE PHASE DUAL COMPRESSION-TREE MULTIPLIER

BACKGROUND OF THE INVENTION

1. Field of the Invention

This invention is related to the field of multiplier circuits in processors.

2. Description of the Related Art

Processors continue to be designed for operation at increasing clock frequencies. As the frequency of operation increases, the power consumption of the processors becomes a larger issue.

One function that processors are typically designed to perform is multiplication. That is, many instruction sets include instructions that cause a multiplication of the operands of the instruction, and so the processors include hardware to perform the multiplication (i.e. a multiplier). As clock frequencies have increased, the multiplier has been pipelined to provide for operation at the desired clock frequency while still maintaining a throughput of one multiply per clock cycle.

Unfortunately, pipelining the multiplier may lead to increased power consumption in the multiplier. For example, many multipliers are designed to perform multiplication using Booth encoding. In Booth encoding, a relatively large number of partial products are generated and then summed to produce the multiplication result. If the multiplier is pipelined, the partial products may have to be captured (e.g. in a latch) to provide a stable input to the next stage in the multiplier pipeline. Since there is a large number of partial products, the number of latches is large. Latches generally consume larger amounts of power, due to their clocked nature, than non-clocked circuits such as logic gates. The power consumption in the relatively large number of latches may thus be a significant component of the power consumed in the multiplier. Additionally, in some cases, the latency added by the latches may increase the latency of the multiplication, which may reduce performance.

SUMMARY OF THE INVENTION

In one embodiment, a multiplier includes a plurality of subunits. Each of the plurality of subunits is configured to perform a portion of a multiplication operation, and the plurality of subunits are coupled together to perform the multiplication operation. At least a first subunit of the plurality of subunits and a second subunit of the plurality of subunits are configured to perform a same portion of the multiplication operation. The first subunit and the second subunit are clocked at a first clock frequency, during use, that is less than a second clock frequency at which a remainder of the plurality of subunits are clocked during use. For example, in some embodiments the first clock frequency may be ½ of the second clock frequency and the first and second subunits may be clocked 180 degrees out of phase. The first subunit and the second subunit each have inputs coupled to a third subunit of the plurality of subunits to receive multiplication operations to be operated upon by the respective first subunit and second subunit. A processor comprising an execution unit including the multiplier and a scheduler is also contemplated.

In another embodiment, a multiplier includes an encoder circuit, a first partial product generation circuit coupled to the encoder circuit, a first compression tree circuit coupled to the first partial product generation circuit, a second partial product generation circuit coupled to the encoder circuit, a second compression tree circuit coupled to the second partial product generation circuit. The encoder circuit is configured to encode a multiplier into an encoded multiplier and is clocked at a first clock frequency during use. The first and second partial product generation circuits and the first and second compression tree circuits are clocked at a second clock frequency during use that is less than the first clock frequency. The first partial product generation circuit and the first compression tree circuit operate out of phase with the second partial product generation circuit and the second compression tree circuit.

BRIEF DESCRIPTION OF THE DRAWINGS

The following detailed description makes reference to the accompanying drawings, which are now briefly described.

Figure 1:
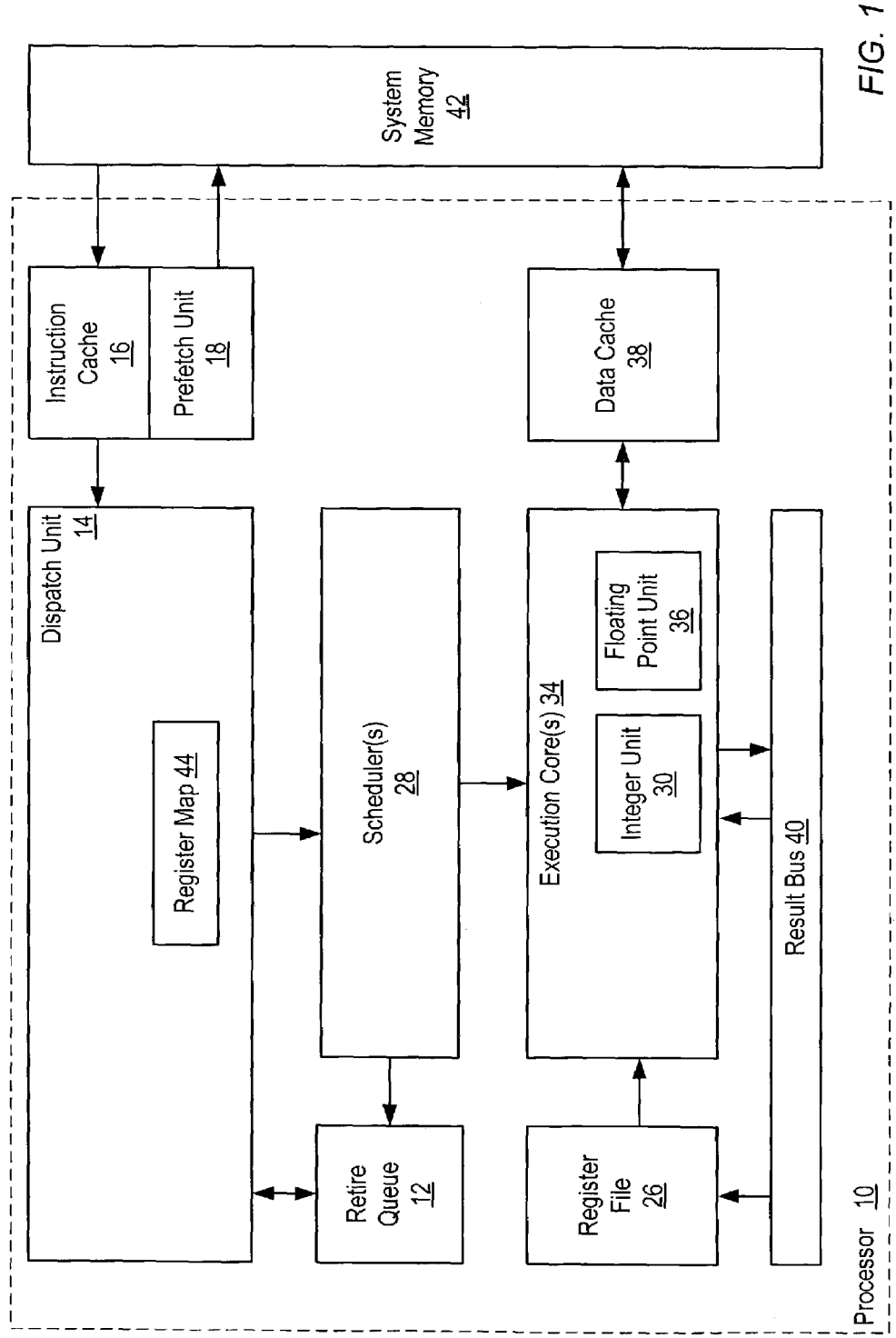
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Processor Overview

FIG. 1 is a block diagram of one embodiment of a processor 10. The processor 10 is configured to execute instructions stored in a system memory 42. Many of these instructions operate on data stored in the system memory 42. It is noted that the system memory 42 may be physically distributed throughout a computer system and/or may be accessed by one or more processors 10.

In the illustrated embodiment, the processor 10 may include an instruction cache 16 and a data cache 38. The processor 10 may include a prefetch unit 18 coupled to the instruction cache 16. A dispatch unit 14 may be configured to receive instructions from the instruction cache 16 and to dispatch operations to the scheduler(s) 28. One or more of the schedulers 28 may be coupled to receive dispatched operations from the dispatch unit 14 and to issue operations to the one or more execution cores 34. The execution core(s) 34 may include one or more integer units (e.g. an integer unit 30 illustrated in FIG. 1) and one or more floating point units (e.g. a floating point unit 36 illustrated in FIG. 1). Results generated by the execution core(s) 34 may be output to a result bus 40. These results may be used as operand values for subsequently issued instructions and/or stored to the register file 26. A retire queue 12 may be coupled to the scheduler(s) 28 and the dispatch unit 14. The retire queue may be configured to determine when each issued operation may be retired. In one embodiment, the processor 10 may be designed to be compatible with the x86 architecture. Note that the processor 10 may also include many other components. For example, the processor 10 may include a branch prediction unit (not shown).

The instruction cache 16 may store instructions for fetch by the dispatch unit 14. Instruction code may be provided to the instruction cache 16 for storage by prefetching code from the system memory 42 through the prefetch unit 18. Instruction cache 16 may be implemented in various configurations (e.g., set-associative, fully-associative, or direct-mapped).

The prefetch unit 18 may prefetch instruction code from the system memory 42 for storage within the instruction cache 16. The prefetch unit 18 may employ a variety of specific code prefetching techniques and algorithms.

The dispatch unit 14 may output signals including operations executable by the execution core(s) 34 as well as operand address information, immediate data and/or displacement data. In some embodiments, the dispatch unit 14 may include decoding circuitry (not shown) for decoding certain instructions into operations executable within the execution core(s) 34. Simple instructions may correspond to a single operation. In some embodiments, more complex instructions may correspond to multiple operations. Upon decode of an operation that involves the update of a register, a register location within register file 26 may be reserved to store speculative register states (in an alternative embodiment, a reorder buffer may be used to store one or more speculative register states for each register). A register map 44 may translate logical register names of source and destination operands to physical register names in order to facilitate register renaming. The register map 44 may track which registers within the register file 26 are currently allocated and unallocated.

The processor 10 of FIG. 1 may support out of order execution. The retire queue 12 may keep track of the original program sequence for register read and write operations, allow for speculative instruction execution and branch misprediction recovery, and facilitate precise exceptions. In some embodiments, the retire queue 12 may also support register renaming by providing data value storage for speculative register states (e.g. similar to a reorder buffer). In other embodiments, the retire queue 12 may function similarly to a reorder buffer but may not provide any data value storage. As operations are retired, the retire queue 12 may deallocate registers in the register file 26 that are no longer needed to store speculative register states and provide signals to the register map 44 indicating which registers are currently free. By maintaining speculative register states within the register file 26 (or, in alternative embodiments, within a reorder buffer) until the operations that generated those states are validated, the results of speculatively-executed operations along a mispredicted path may be invalidated in the register file 26 if a branch prediction is incorrect.

The register map 44 may assign a physical register to a particular logical register (e.g. architected register or microarchitecturally specified registers) specified as a destination operand for an operation. The dispatch unit 14 may determine that the register file 26 has one or more previously allocated physical registers assigned to a logical register specified as a source operand in a given operation. The register map 44 may provide a tag for the physical register most recently assigned to that logical register. This tag may be used to access the operand's data value in the register file 26 or to receive the data value via result forwarding on the result bus 40. If the operand corresponds to a memory location, the operand value may be provided on the result bus (for result forwarding and/or storage in the register file 28) through a load/store unit (not shown). Operand data values may be provided to the execution core(s) 34 when the operation is issued by one of the scheduler(s) 28. Note that in alternative embodiments, operand values may be provided to a corresponding scheduler 28 when an operation is dispatched (instead of being provided to a corresponding execution core 34 when the operation is issued).

As used herein, a scheduler is a device that detects when operations are ready for execution and issues ready operations to one or more execution units. For example, a reservation station may be one type of scheduler. Independent reservation stations per execution core may be provided, or a central reservation station from which operations are issued may be provided. In other embodiments, a central scheduler which retains the operations until retirement may be used. Each scheduler 28 may be capable of holding operation information (e.g., the operation as well as operand values, operand tags, and/or immediate data) for several pending operations awaiting issue to an execution core 34. In some embodiments, each scheduler 28 may not provide operand value storage. Instead, each scheduler may monitor issued operations and results available in the register file 26 in order to determine when operand values will be available to be read by the execution core(s) 34 (from the register file 26 or the result bus 40).

The integer units (e.g. the integer unit 30) may be configured to perform integer arithmetic operations of addition and subtraction, as well as shifts, rotates, logical operations, and branch operations. Additionally, one or more of the integer units 30 may include a multiplier for performing multiply operations.

The floating point units (e.g. the floating point unit 36) may be configured to perform floating point operations. One or more of the floating point units 36 may include a multiplier for performing multiply operations.

Multiplier

Turning next to FIGS. 2–5, one embodiment of a multiplier 50 is described. The multiplier 50 may be used, in some embodiments, as a multiplier in one or more integer units (e.g. the integer unit 30 shown in FIG. 1). The multiplier 50 may be used, in other embodiments, as part of the multiplier in one or more floating point units (e.g. the floating point unit 36 shown in FIG. 1). In the floating point units, the multiplier 50 may perform the mantissa multiplication (or significant multiplication), and additional hardware may be employed to handle the exponent calculations.

Generally, the multiplier 50 includes a set of subunits. Each subunit performs a portion of a multiplication operation, and the subunits are coupled together to perform the multiplication operation. At certain points in the processing of a multiplication operation, the amount of data generated in the multiplier 50 may fan out to a large amount which is subsequently reduced to a smaller amount of data. For example, in the illustrated embodiment, Booth encoding is used. In Booth encoding, a relatively large number of partial products are generated and then compressed together to form the product (e.g. by summing the partial products).

The multiplier 50 may implement two or more subunits which are each assigned the same portion of the multiplication operation ("replicated subunits"). In particular, the portion of the multiplication operation assigned to each of the replicated subunits may encompass the large data fan out and subsequent compression to a small amount of data, so that the large data fan out need not be captured in clocked storage devices. Power consumption of the replicated subunits may be less, in some embodiments, than the power consumption if no replication were performed and the additional clocked storage devices to capture the large data fan out were implemented. Additionally, the latency of the multiplication operation may be improved, in some embodiments, since the additional clocked storage devices are not provided in the path. The time that would otherwise be spent in capturing the data into the additional clocked storage devices may be used to perform other work.

The replicated subunits may be coupled in parallel within the multiplier 50 and may be clocked at a first clock frequency that is less than a second clock frequency at which the remaining subunits are clocked, during use. A given multiplication operation may be handled in one of the replicated subunits, and a subsequent multiplication operation may be handled in another one of the replicated subunits. Throughput of the multiplier 50 (at the second clock frequency) may be maintained at, e.g., one multiplication operation per clock cycle. In one implementation, the replicated subunits may be operated out of phase with each other. At any given clock cycle at the second clock frequency, one of the replicated subunits may be prepared to accept a multiplication operation, and that replicated subunit may receive a multiplication operation in that clock cycle. For example, in the illustrated embodiment, there are two replicated subunits that are operated 180 degrees out of phase at ½ the clock frequency of the other units. In other embodiments, additional replicated subunits may be employed and may be operated at a clock frequency that is a smaller fraction of the clock frequency of the other units (e.g. 3 replicated subunits operated at ⅓ of the clock frequency, 4 replicated subunits operated at ¼ of the clock frequency, etc.).

As used herein, a subunit may include any circuitry which performs a portion of a multiplication operation and is clocked by a clock signal. The subunit performs its assigned portion during the period of the clock signal that clocks that subunit.

Figure 2:
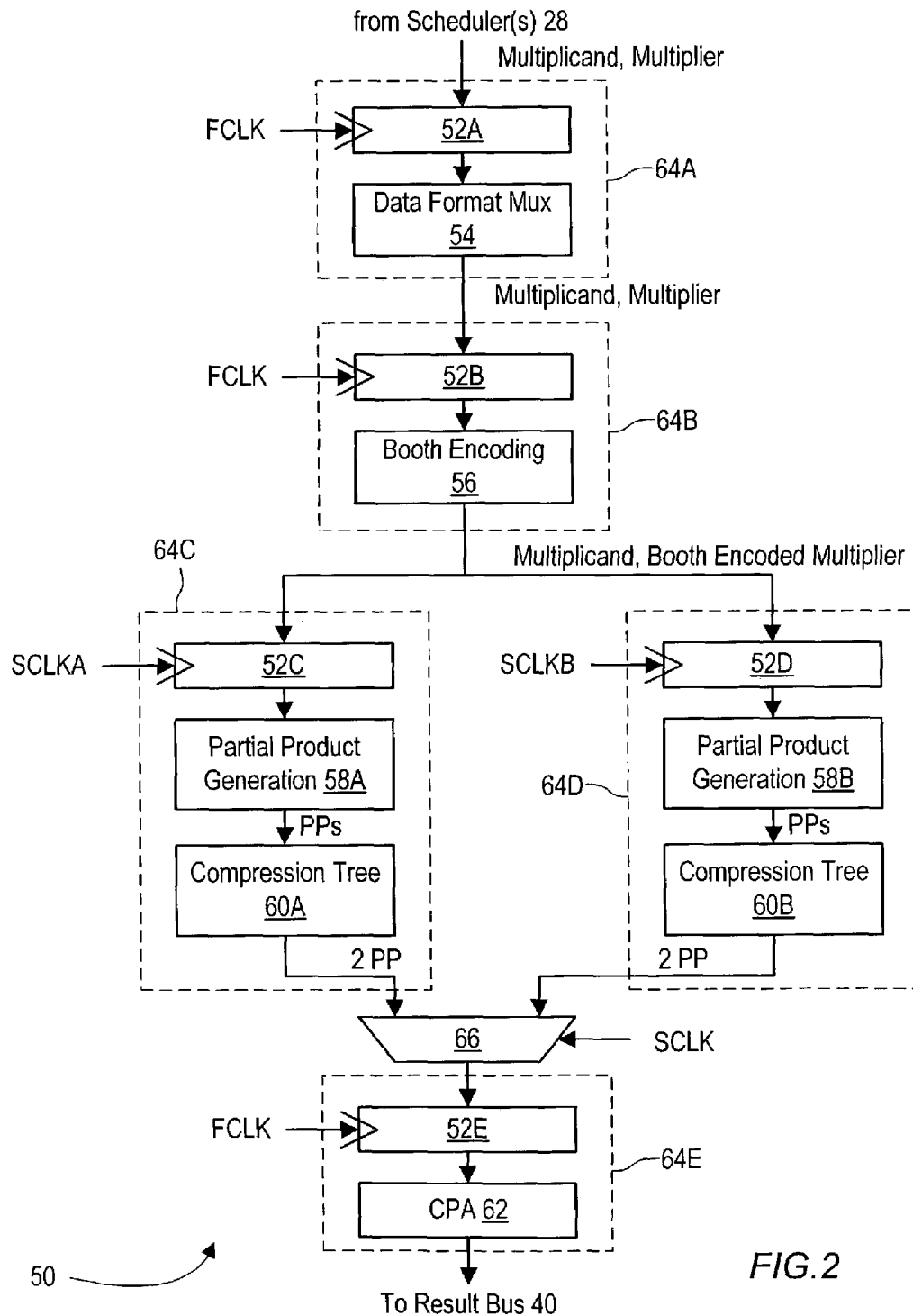
FIG. 2 is a block diagram of one embodiment of a multiplier circuit.

Turning now to FIG. 2, a block diagram of one embodiment of the multiplier 50 is shown. The subunits may include pipeline stages in a pipelined multiplier 50 that supports up to one multiplication operation per clock cycle. The pipelined multiplier 50 generally operates according to the clock signal FCLK illustrated in FIG. 2. The clock signal FCLK may have the second clock frequency during operation. Illustrated in FIG. 2 are a set of flops 52A–52E that delimit the pipeline stages for this embodiment. In other embodiments, the pipeline stages may be delimited in other fashions and there may be more or fewer pipeline stages. While flops are used in this embodiment, generally any clocked storage device may be used (e.g. flops, registers, latches, etc.). The flops 52A–52B and 52E are clocked by the clock signal FCLK. The flops 52C–52D are clocked by the clock signals SCLKA and SCLKB, respectively. The clock signals SCLKA and SCLKB may have the first clock frequency during operation that may be approximately ½ of the second clock frequency. The SCLKA and SCLKB clock signals may be 180 degrees out of phase with each other.

The subunits in the embodiment of FIG. 2 may include: a first subunit 64A comprising the flop 52A and the data format muxing circuit 54; a second subunit 64B comprising the flop 52B and the Booth encoding circuit 56; a third subunit 64C comprising the flop 52C, a first partial product generation circuit 58A, and a first compression tree circuit 60A; a fourth subunit 64D comprising the flop 52D, a second partial product generation circuit 58B, and a second compression tree circuit 60B; and a fifth subunit 54E comprising the flop 52E and a carry propagate adder (CPA) 62. The first subunit 64A is coupled to receive a multiplicand and a multiplier from the scheduler(s) 28, and is coupled to the second subunit 64B. The second subunit 64B is coupled to the third subunit 64C and the fourth subunit 64D. The third subunit 64C and the fourth subunit 64D are coupled as inputs to a multiplexor circuit 66, which has an output coupled to the fifth subunit 64E. The fifth subunit 64E is coupled to the result bus 40. Thus, the first subunit, the second subunit, and the fifth subunit are clocked at the second clock frequency (of the clock signal FCLK). The third subunit and the fourth subunit are clocked at the first clock frequency (of the clock signals SCLKA and SCLKB) and are replicated subunits, in this embodiment.

The clock cycles of the clock signal FCLK may be viewed as alternating even and odd clock cycles. The even clock cycles may be the clock cycles in which the rising edge of the clock signal FCLK and the rising edge of the clock signal SCLKA are approximately coincident (and thus the third subunit 64C is prepared to receive an input from the second subunit 64B during the even FCLK clock cycle). Similarly, the odd clock cycles may be the clock cycles in which the rising edge of the clock signal FCLK and the rising edge of the clock signal SCLKB are approximately coincident (and thus the fourth subunit 64D is prepared to receive an input from the second subunit 64B during the odd FCLK clock cycle).

A multiplicand and multiplier are received from the scheduler(s) 28 into the flop 52A. The data format muxing circuit 54 may perform preliminary muxing on the operands. For example, in some embodiments, the floating point unit 36 may handle ×87 floating point operations (single or double precision floating point operands), various single instruction, multiple data (SIMD) operands such as the paired single precision floating point operands as specified in the 3DNow! specification from Advanced Micro Devices, Inc.; 4 single precision SIMD operands or 2 double precision SIMD operands as specified in the streaming SIMD extension (SSE) from Intel Corp.; or the SIMD integer operands specified in the multimedia extension (MMX) from Intel Corp. The format muxing circuit may modify these various operand formats (e.g. by sign extending them and aligning the provided bits to the operand format used by the multiplier 50) to provide a common format to the remainder of the multiplier 50. Additionally, in some embodiments, the multiplier 50 may be configured to iterate for a given multiplication operation (e.g. for floating point operations such as square root, sine, cosine, etc. that may be approximated through Newton-Raphson approximations, for example). In such embodiments, the data format muxing circuit may select between operands from the scheduler(s) 28 and the intermediate results from earlier iterations. It is noted that, in other embodiments, the formatting may be performed outside of the multiplier 50 or the multiplier 50 may be designed for a single format, and thus the data format muxing circuit 54 (and the first subunit as a whole) may be optional and may be deleted in other embodiments.

The multiplicand and multiplier (possibly formatted by the data format muxing circuit 54) are received into the flop 52B. The Booth encoding circuit 56 Booth-encodes the multiplier. In one embodiment, Booth-2 encoding is used. In Booth-2 encoding, sets of 3 bits of the multiplier are examined to produce each partial product, wherein consecutive sets of 3 bits overlap in the most significant bit of one set and the least significant bit of the other set. For example, the first set of bits includes bits 1-0 of the multiplier and a padded zero as the least significant bit; the second set of bits includes bits 3-1 of the multiplier; the third set of bits includes bits 5-3 of the multiplier, etc. In a Booth-2 embodiment, the Booth encoding circuit 56 may generate the sets of 3 bits.

One of the flops 52C–52D receives the multiplicand and the Booth-encoded multiplier from the Booth encoding circuit 56 depending on whether the clock cycle of the FCLK clock signal is an even clock cycle or an odd clock cycle as described above. The corresponding partial product generation circuit 58A–58B generates the partial products from the multiplicand and the Booth-encoded multiplier. The corresponding compression tree circuit 60A–60B receives the partial products and compresses the partial products down to fewer partial products (e.g. 2 in this embodiment), which are supplied to the multiplexor circuit 66. The multiplexor circuit 66 selects the output of the compression tree circuit 60A at the end of the SCLKA clock cycle, and the output of the compression tree circuit 60B at the end of the SCLKB clock cycle. Viewed in another way, the multiplexor circuit 66 alternately selects the output of the compression tree circuit 60A and the compression circuit 60B on consecutive FCLK clock cycles. Thus, the multiplication operations are muxed back into the pipeline operating at the FCLK clock frequency. In the illustrated embodiment, the multiplexor circuit 66 may receive an SCLK clock signal as a select input. The SCLK clock signal may be approximately in phase with the SCLKA clock signal and have approximately the same frequency as the SCLKA clock signal, with approximately a 50% duty cycle.

The flop 52E receives the two partial products output by the multiplexor 66. The CPA 62 adds the two partial products to generate a result, which may be transmitted on the result bus 40. It is noted that, in some embodiments for floating point multiplications, the multiplier 50 may include a sixth subunit (or even additional subunits) to handle additional result modifications (e.g. rounding, sticky bit logic, exception reporting, etc.).

It is noted that, in embodiments that may handle SIMD operands, the multiplier 50 may implement masking between the partial product generation circuits 58A–58B and the corresponding compression tree 60A–60B to mask partial products which are not part of the SIMD multiplications (e.g. partial products that represent multiplying one portion of one of the SIMD multiplier by a different portion of the SIMD multiplicand).

Generally, a partial product is a value which, when added to other partial products corresponding to a multiplier and multiplicand, produces the product of the multiplicand. The partial product may represent multiplying a portion of the multiplier by the multiplicand, and may be left shifted by a number of positions corresponding to the position of the portion of the multiplier within the multiplier. A compression tree may include any circuitry which receives a set of partial products and outputs a smaller number of partial products that still represents the same product as the received set.

It is noted that the above description may describe clock signals as being approximately in phase, approximately 180 degrees out of phase, approximately the same frequency, approximately ½ the frequency, etc. Nominally, the clock signals may be in phase, 180 degrees out of phase, the same frequency, or ½ the frequency, respectively. However, in practice there may be some variation due to clock jitter, noise, temperature, manufacturing variations, etc. between the clock signals.

It is noted that subunits 64C and 64D may be placed physically on an integrated circuit in any desired fashion (e.g. side by side, interleaved, etc.). In one embodiment, an interleaved approach is used to balance wire delay into an out of the two subunits.

Figure 3:
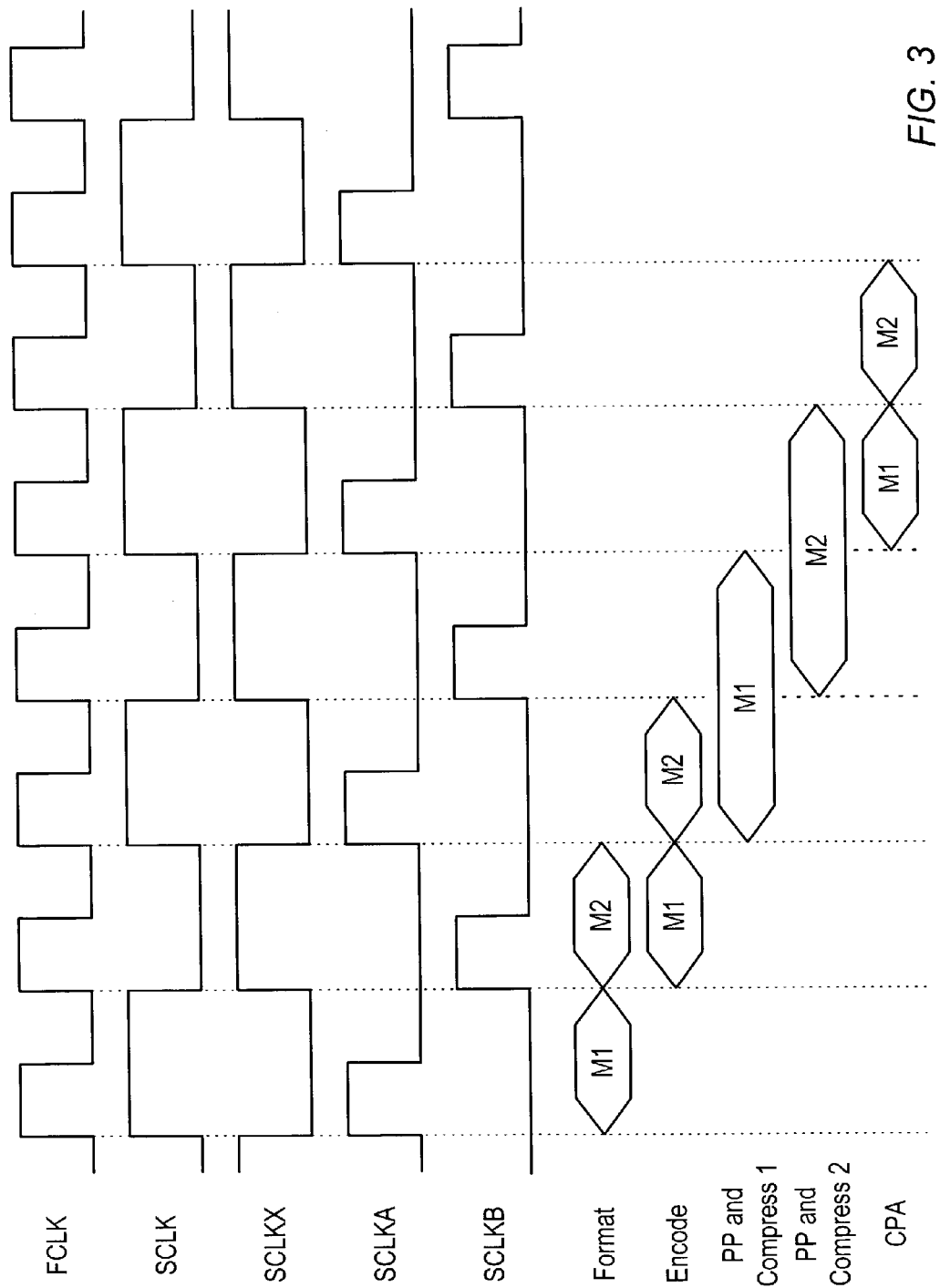
FIG. 3 is a block diagram of one example of clock signals provided to the multiplier circuit shown in FIG. 2 and an example of multiplication operations flowing through the multiplier circuit shown in FIG. 2.

FIG. 3 is a timing diagram illustrating the clock signals shown in FIG. 2 for one embodiment of the multiplier 50. Additionally, the timing diagram of FIG. 3 illustrates two exemplary multiplication operations (M1 and M2) passing through the embodiment of the multiplier 50 shown in FIG. 2. The FCLK, SCLK, SCLKA, and SCLKB clock signals are shown, as well as an SCLKX clock signal. Additionally, the labels "Format", "Encode", "PP and Compress 1", "PP and Compress 2" and "CPA" are shown in FIG. 3. The Format label corresponds to the data format muxing circuit 54. The Encode label corresponds to the Booth encoding circuit 56. The PP and Compress 1 label corresponds to the partial product generation circuit 58A and the compression tree circuit 60A. Similarly, the PP and Compress 2 label corresponds to the partial product generation circuit 58B and the compression tree circuit 60B. The CPA label corresponds to the CPA 62. Clock cycles of the clock signal FCLK are delimited by vertical dotted lines.

In one embodiment, the clock signals FCLK, SCLK, and SCLKX may be routed throughout the processor 10 illustrated in FIG. 1. As illustrated in FIG. 3, the clock signals SCLK and SCLKX are ½ the frequency of the clock signal FCLK. The clock signal SCLK is approximately in phase with the clock signal FCLK, and the clock signal SCLKX is approximately 180 degrees out of phase with the clock signal FCLK. The clock signals SCLK and SCLKX may be used as clock gating signals for the clock signal FCLK to generate the clock signals SCLKA and SCLKB, respectively, illustrated in FIG. 3. That is, the clock signal SCLKA may be generated by logically ANDing the clock signals FCLK and SCLK, and the clock signal SCLKB may be generated by logically ANDing the clock signals FCLK and SCLKX.

In the first FCLK clock cycle in FIG. 3, the M1 operation is processed by the data format muxing circuit 54, and the M2 operation is processed in the following clock cycle. The M1 and M2 operations are pipelined to the Booth encoding circuit 56 in the second and third FCLK clock cycles, respectively. Since the M1 operation arrives at the flops 54C and 54D at the start of an even clock cycle (SCLKA rising edge coincident with the FCLK rising edge), the M1 operation is processed in the partial product generation circuit 58A and the compression tree circuit 60A over the third and fourth FCLK clock cycles. Conversely, the M2 operation arrives at the flops 54C and 54D at the start of an odd clock cycle (SCLKB rising edge coincident with the FCLK rising edge), and thus the M2 operation is processed in the partial product generation circuit 58B and the compression tree circuit 60B over the fourth and fifth FCLK clock cycles. The M1 operation is processed in the CPA 62 during the fifth FCLK clock cycle, and the M2 operation is processed in the CPA 62 during the following sixth FCLK clock cycle. Thus, a throughput of one multiply per clock cycle of the clock signal FCLK may be achieved in the multiplier 50, even with the subunits 64C and 64D operating at a lower clock frequency than that of the clock signal FCLK.

Figure 4:
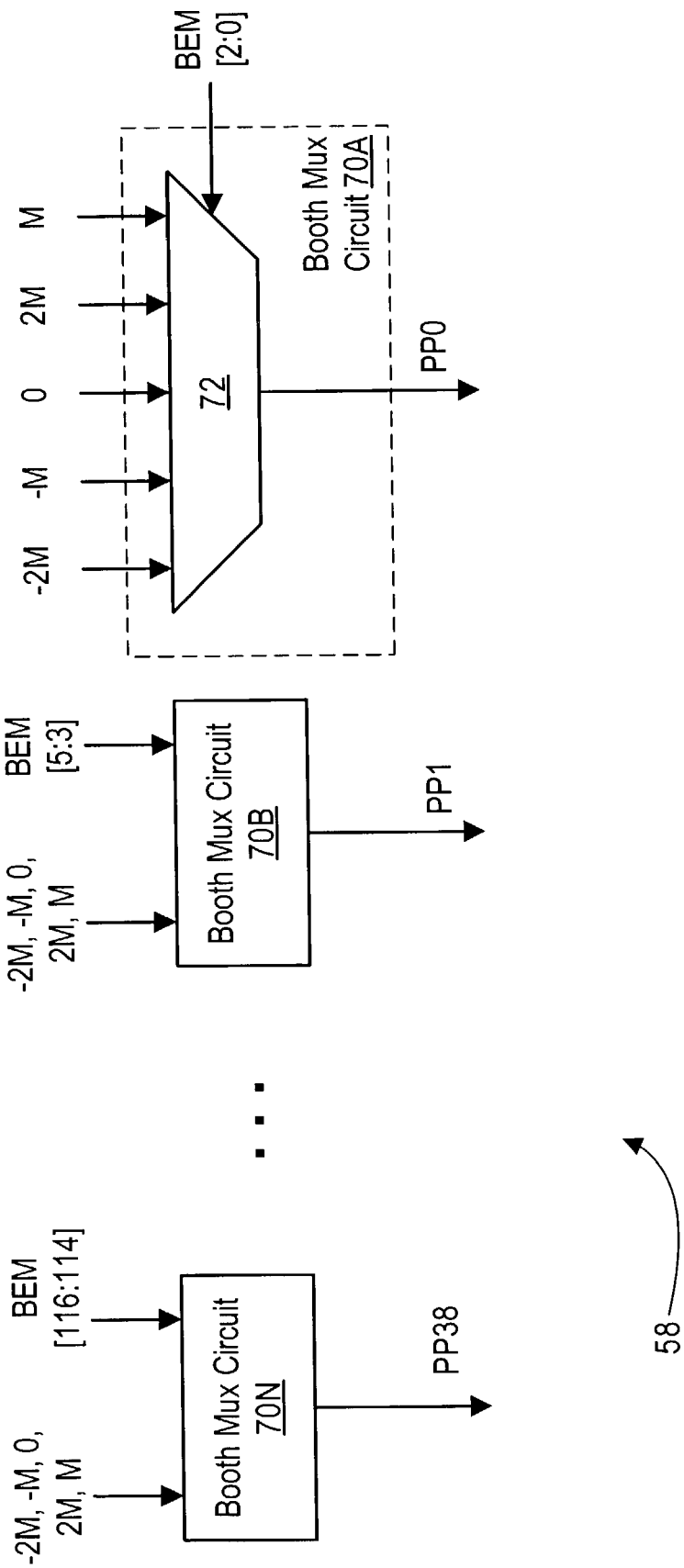
FIG. 4 is a block diagram of one embodiment of a partial product generation circuit shown in FIG. 2.

Turning now to FIG. 4, a block diagram of one embodiment of a partial product generation circuit 58 is shown. The partial product generation circuit 58 may be used as the partial product generation circuits 58A and 58B in FIG. 2, for example, for some embodiments that employ Booth-2 encoding. In the embodiment of FIG. 4, the partial product generation circuit 58 includes a plurality of Booth mux circuits 70A–70N. Each Booth mux circuit 70A–70N is coupled to receive the multiplicand (M), twice the multiplicand (2M), the multiplicand negated (−M), twice the multiplicand negated (−2M), and zero. Additionally, each Booth mux circuit is coupled to receive a portion of the Booth-encoded multiplier (BEM in FIG. 4).

The Booth mux circuit 70A is shown in greater detail as a multiplexor circuit 72 which selects between the M, 2M, 0, −M, and −2M inputs responsive to the received BEM bits. Other Booth mux circuits 70B–70N may be similar. The selected value is output as the partial product from the Booth mux circuit 70A (PP0 in FIG. 4). In a similar fashion, each of the Booth mux circuits 70B–70N outputs a partial product. The selection is made according to the Booth-2 encoding method. That is: if the BEM bits (in binary) are '000', then 0 is selected; if the BEM bits are '001', then M is selected; if the BEM bits are '010', then M is selected; if the BEM bits are '011', then 2M is selected; if the BEM bits are '100', then −2M is selected; if the BEM bits are '101', then −M is selected; if the BEM bits are '110', then −M is selected; and if the BEM bits are '111', then 0 is selected.

The embodiment illustrated in FIG. 4 selects 39 partial products (PP38–PP0). Thus, the illustrated embodiment may be used for a 76 bit multiplier. Other embodiments may employ more or fewer Booth mux circuits 70 to output more or fewer partial products depending on the number of bits in the multiplier.

It is noted that 2M may be generated as a one bit left shift of M (e.g. a wire shift on the input to the mux 72). Similarly, −2M may be generated as a one bit left shift of −M. The −M value may be generated as a twos complement of the M value, e.g. by inverting each bit and adding one in the least significant bit. In some embodiments, the addition of one may occur in the next stage of the partial product generation, in the least significant bit of that partial product. In one embodiment, the multiplexor circuit 72 represents a plurality of muxes, one for each bit of the partial product, that selects either the corresponding bit of M, the next most significant bit to the corresponding bit of M, inversions of those bits (for −M and −2M, respectively), and zero. It is noted that the output of the Booth mux circuits 70A–70N may be padded on the right with a number of zeros dependent on its position. Each output is padded by two additional zeros as compared to its neighbor to the right. The Booth mux circuit 70A is padded with no zeros; the Booth mux circuit 70B is padded with two zeros; etc.

Figure 5:
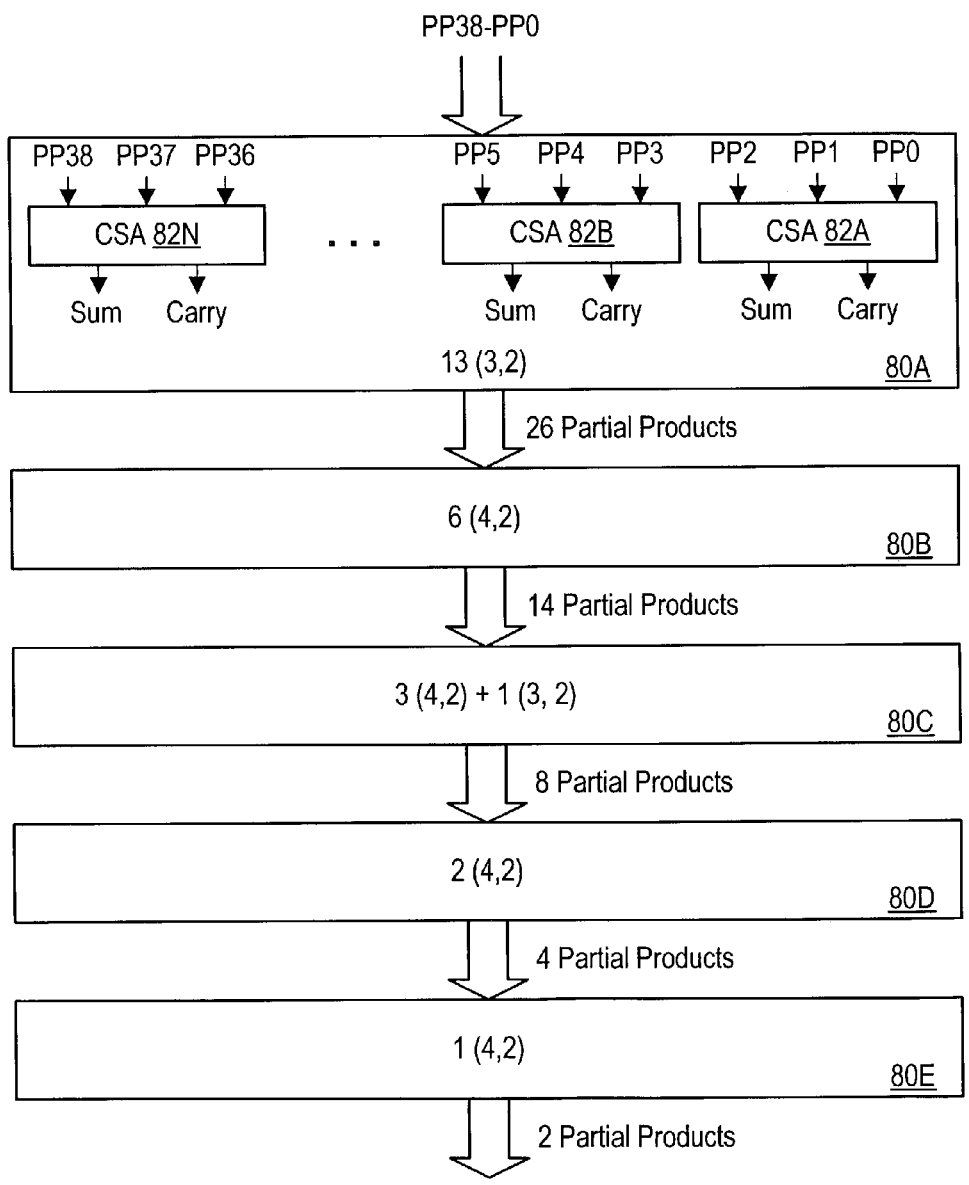
FIG. 5 is a block diagram of one embodiment of a compression tree circuit shown in FIG. 2.

Turning next to FIG. 5, a block diagram of one embodiment of a compression tree circuit 60 is shown. The compression tree circuit 60 may be used as the compression tree circuits 60A and 60B in FIG. 2, for example. Several compression levels 80A–80E are illustrated in FIG. 5. Each compression level is coupled to receive the partial products from the preceding compression level, except for compression level 80A which receives the partial products from the partial product generator circuit 58. The embodiment illustrated in FIG. 5 compresses 39 partial products to two resulting partial products. Other embodiments may compress more or fewer partial products to result in more or fewer resulting partial products.

Generally, each compression level 80A–80E receives a number of partial products and compresses that number to fewer partial products. Each compression level comprises one or more compressors that receive partial products and output fewer partial products that are equal to the sum of the received partial products. In the present embodiment, both 3-2 and 4-2 compressors are used. The 3-2 compressor compresses 3 partial products into 2 partial products, while the 4-2 compressor compresses 4 partial products to two partial products.

Compression level 80A is shown in greater detail to include a set of compressors 82A–82N. Each compressor 82A–82N comprises a carry save adder (CSA) which receives partial product inputs and outputs a sum and carry as the two partial product outputs. Other compressors may be CSAs as well. Compression level 80A includes 13 3-2 compressors (the "13 (3,2)" notation in FIG. 5) and thus compresses 39 partial products to 26 partial products.

Compression level 80B includes 6 4-2 compressors (the "6 (4,2)" notation in FIG. 5) and thus compresses 24 of the 26 partial products from compression level 80A to 12 partial products and passes the remaining two partial products from compression level 80A on unmodified for a total of 14 partial product outputs. Compression level 80C includes 3 4-2 compressors and 1 3-2 compressor to compress the 14 partial products from compression level 80B to 8 partial products. Compression level 80D employs 2 4-2 compresses to compress the 8 partial products to 4 partial products, which compression level 80E compresses to 2 partial products in a 4-2 compressor.

Computer Systems

Figure 6:
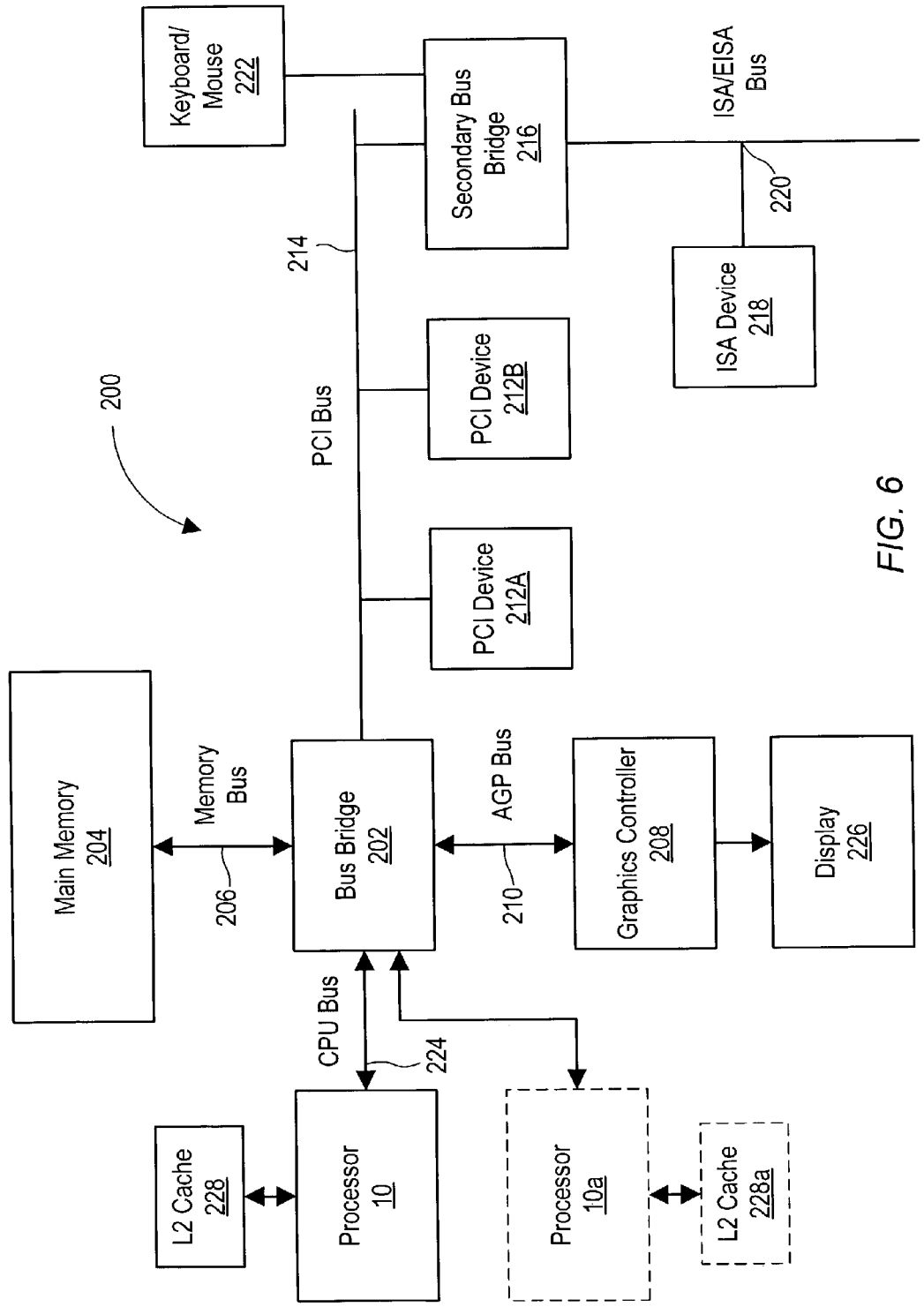
FIG. 6 is a block diagram of one embodiment of a computer system including the processor shown in FIG. 1.

Turning now to FIG. 6, a block diagram of one embodiment of a computer system 200 including processor 10 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple. The processor 10 may be the processor 10 shown in FIG. 1, and may implement one or more multipliers such as the multiplier shown in FIG. 2.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM), double data rate (DDR) SDRAM, or Rambus DRAM (RDRAM) may be suitable. Main memory 204 may include the system memory 42 shown in FIG. 1.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 6) or may share CPU bus 224 with processor 10. Furthermore, processor 10a may be coupled to an optional L2 cache 228a similar to L2 cache 228.

Figure 7:
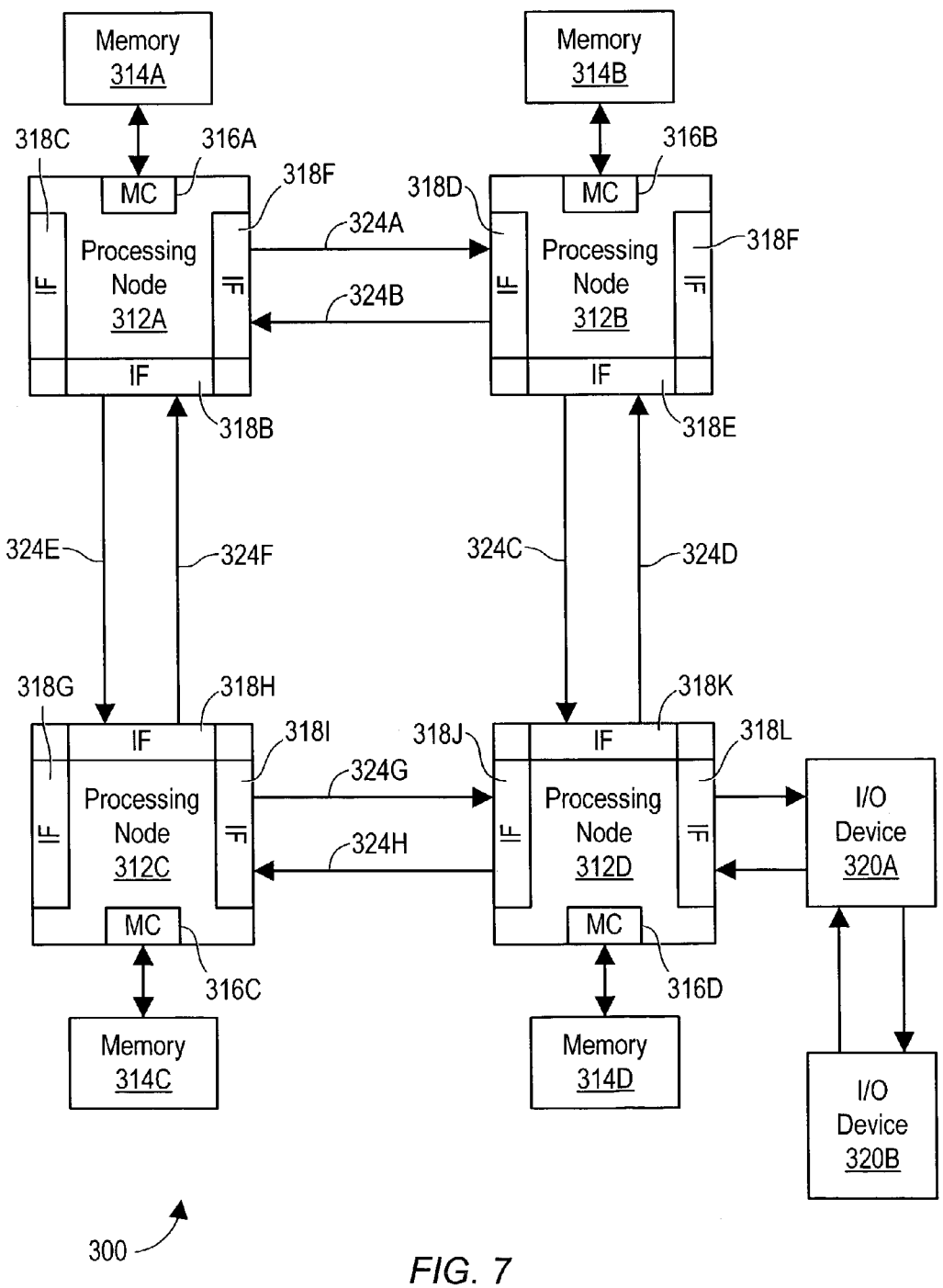
FIG. 7 is a block diagram of a second embodiment of a computer system including the processor shown in FIG. 1.

Turning now to FIG. 7, another embodiment of a computer system 300 is shown. In the embodiment of FIG. 7, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 7. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 7. Any suitable routing algorithm may be used. Other embodiments of computer system 300 may include more or fewer processing nodes then the embodiment shown in FIG. 7.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10 as shown in FIG. 1 (e.g. including one or more multipliers as shown in FIG. 2). External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), DDR SDRAM, static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicating with another computer system to which the devices may be coupled (e.g. network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A multiplier comprising a plurality of subunits, wherein each of the plurality of subunits is configured to perform a portion of a multiplication operation and wherein the plurality of subunits are coupled together to perform the multiplication operation, wherein at least a first subunit of the plurality of subunits and a second subunit of the plurality of subunits are configured to perform a same portion of the multiplication operation, and wherein the first subunit and the second subunit are clocked at a first clock frequency, during use, that is less than a second clock frequency at which a remainder of the plurality of subunits are clocked during use, and wherein the first subunit and the second subunit each have inputs coupled to a third subunit of the plurality of subunits to receive multiplication operations to be operated upon by the respective first subunit and second subunit.

2. The multiplier as recited in claim 1 wherein the first subunit is clocked by a first clock signal having the first clock frequency and the second subunit is clocked by a second clock signal having the first clock frequency, and wherein the first clock signal and the second clock signal are out of phase.

3. The multiplier as recited in claim 2 wherein the first clock signal and the second clock signal are approximately 180 degrees out of phase.

4. The multiplier as recited in claim 1 wherein the first clock frequency is approximately ½ of the second clock frequency.

5. The multiplier as recited in claim 1 wherein the outputs of the first subunit and the second subunit are coupled to a multiplexor circuit configured to select the output of the first subunit and the output of the second subunit on alternating clocks of a third clock signal having the second clock frequency.

6. The multiplier as recited in claim 5 wherein a select signal of the multiplexor is a fourth clock signal having the first clock frequency and in phase with a first clock signal clocking the first subunit.

7. The multiplier as recited in claim 5 wherein an output of the multiplexor circuit is coupled as the input to a fourth subunit of the plurality of subunits.

8. The multiplier as recited in claim 7 wherein the fourth subunit comprises a carry propagate adder circuit.

9. The multiplier as recited in claim 1 wherein the first subunit comprises a partial product generation circuit and a compression tree circuit coupled to the partial product generation circuit.

10. The multiplier as recited in claim 9 wherein the third subunit comprises a booth encoder circuit.

11. A processor comprising:
an execution unit comprising a multiplier comprising a plurality of subunits, wherein each of the plurality of subunits is configured to perform a portion of a multiplication operation and wherein the plurality of subunits are coupled together to perform the multiplication operation, wherein at least a first subunit of the plurality of subunits and a second subunit of the plurality of subunits are configured to perform a same portion of the multiplication operation, and wherein the first subunit and the second subunit are clocked at a first clock frequency, during use, that is less than a second clock frequency at which a remainder of the plurality of subunits are clocked during use, and wherein the first subunit and the second subunit each have inputs coupled to a third subunit of the plurality of subunits to receive multiplication operations to be operated upon by the respective first subunit and second subunit; and
a scheduler configured to schedule a first multiplication operation and a second multiplication operation for execution at the second clock frequency.

12. The processor as recited in claim 11 wherein the execution unit is a floating point unit, and wherein the multiplication operations performed by the multiplier are floating point multiplications.

13. The processor as recited in claim 12 wherein the third subunit comprises a booth encoder circuit.

14. The processor as recited in claim 11 wherein the execution unit is an integer unit, and wherein the multiplication operations performed by the multiplier are integer multiplications.

15. The processor as recited in claim 11 wherein the first subunit is clocked by a first clock signal having the first clock frequency and the second subunit is clocked by a second clock signal having the first clock frequency, and wherein the first clock signal and the second clock signal are out of phase.

16. The processor as recited in claim 15 wherein the first clock signal and the second clock signal are approximately 180 degrees out of phase.

17. The processor as recited in claim 15 wherein the outputs of the first subunit and the second subunit are coupled to a multiplexor circuit configured to select the output of the first subunit and the output of the second subunit on alternating clocks of a third clock signal having the second clock frequency.

18. The processor as recited in claim 17 wherein a select signal of the multiplexor is a fourth clock signal having the first clock frequency and in phase with a first clock signal clocking the first subunit.

19. The processor as recited in claim 17 wherein an output of the multiplexor circuit is coupled as the input to a fourth subunit of the plurality of subunits.

20. The processor as recited in claim 19 wherein the fourth subunit comprises a carry propagate adder circuit.

21. The processor as recited in claim 11 wherein the first clock frequency is approximately ½ of the second clock frequency.

22. The processor as recited in claim 11 wherein the first subunit comprises a partial product generation circuit and a compression tree circuit coupled to the partial product generation circuit.

23. A multiplier comprising:

an encoder circuit configured to encode a multiplier into an encoded multiplier, the encoder circuit clocked at a first clock frequency during use;

a first partial product generation circuit coupled to the encoder circuit, the first partial product generation circuit clocked at a second clock frequency during use that is less than the first clock frequency;

a first compression tree circuit coupled to the first partial product generation circuit and clocked at the second clock frequency;

a second partial product generation circuit coupled to the encoder circuit, the second partial product generation circuit clocked at the second clock frequency during use;

a second compression tree circuit coupled to the second partial product generation circuit and clocked at the second clock frequency;

wherein the first partial product generation circuit and the first compression tree circuit operate out of phase with the second partial product generation circuit and the second compression tree circuit.

* * * * *